Jan. 25, 1966  W. G. GRETSINGER  3,231,214
REEL
Filed Jan. 28, 1964

INVENTOR
WILLIAM G. GRETSINGER
BY
Featherstonhaugh & Co.
ATTORNEYS

United States Patent Office 3,231,214
Patented Jan. 25, 1966

3,231,214
REEL
William G. Gretsinger, 5349 Slocan St., Vancouver,
British Columbia, Canada
Filed Jan. 28, 1964, Ser. No. 340,690
4 Claims. (Cl. 242—107.4)

This invention relates to a reel which may be predeterminedly set to permit a desired length of rope or line to be unreeled therefrom and which automatically reels in the rope or line once the tension from the latter has been released. The reel is particularly adaptable for use in water skiing where two or more water skiers are being towed in a boat. In water skiing, the ropes which are held by the skiers are of varying individual lengths to permit each skier freedom of lateral movement, that is to say, to permit any skier to cross the path of another.

One of the objects of this invention is to provide a reel which in concert with other similar reels may be affixed on the stern of a boat or the like, and which may be preset to provide a desired length of rope to be unreeled therefrom, whereby each rope to be used by a skier may be quite different in unreeled length to all other ropes.

Another object of this invention is to provide a reel in which a spring wound member will automatically wind the rope once the tension has been released therefrom so that any one rope, in the event that it should be released by a skier, may be automatically reeled in, thereby eliminating the obvious dangers in dangling rope to the remainder of the skiers being pulled by the boat.

The present invention comprises a rotatable reel over which a rope may be wound, an index member operatively connected to the reel for cooperative movement therewith as the latter is rotated, said index member presenting a series of stops spaced in predetermined following sequence, and a detent adapted to be positioned in the path of a selected stop to engage the latter and halt the rotation of the reel after a predetermined length of rope has been unwound therefrom, said detent being positionally adjustable to permit same to be placed in the path of any one of said stops.

In the drawings, which illustrate the embodiments of the invention,

Figure 1:
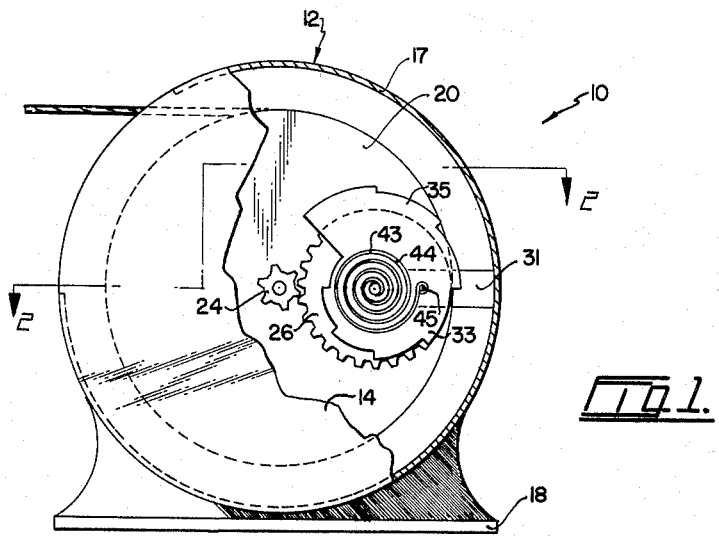
FIGURE 1 is a side elevation of the invention, partially in section.
Figure 2:
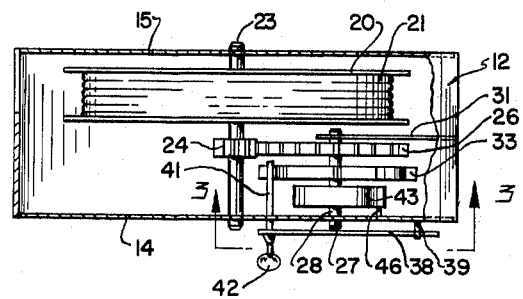
FIGURE 2 is a plan view taken along line 2—2 of FIGURE 1.
Figure 3:
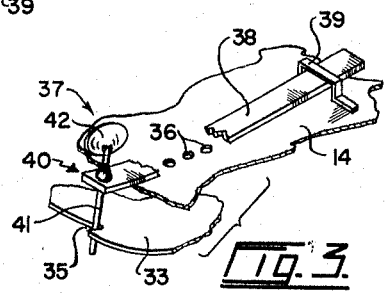
FIGURE 3 is an isometric view of the detent viewed in the direction 3—3 of FIGURE 2.

Referring to the drawings and with particular reference to FIGURES 1, 2 and 3, the reel apparatus generally numbered herein as 10, comprises a frame 12 having vertical parallel side plates 14 and 15 which are held in spaced relationship by end members 17, said side plates and end members being secured to a base 18, by which the apparatus may be affixed to the end of a boat or the like in any suitable manner.

A reel 20 around which a rope 21 is wound is mounted for rotation between the side plates 14 and 15 on a transverse drive shaft 23, said shaft being journalled for rotation at each end in suitable bearings affixed to each plate, said shaft and reel being fixedly secured so that they rotate in unison. Also fixedly secured to the shaft for rotation therewith is a pinion gear 24 which is arranged to mesh with a spur gear 26, said spur gear being fixedly mounted on a short shaft 27, the latter being rotatably supported at one end 28 in suitable bearings affixed to side plate 14, and at the other end 29 in suitable bearings affixed to a support member 31, lying intermediately between side plates 14 and 15 and being rigidly secured by welding or the like to one of the end members 17. The gear ratio between the pinion 24 and spur gear 26 is such that when the rope is unwound from its reeled position to its completely unwound position to thereby rotate the reel and pinion gear 24, the spur gear 26 and short shaft 27 will revolve less than one complete turn.

Also fixedly secured to the short shaft 27 for rotation therewith is an index plate 33. The index plate 33 is in the form of a disc, the peripheral edge of which is shaped to provide a series of circumferentially spaced stop faces 35, each of the stop faces in the series being spaced radially outwardly of the one preceding it. Each of the stop faces 35 lie normal to the rotative path it follows as the index plate 33 is revolved, and said index plate 33 is disposed on the short shaft 27 so that the stop faces present themselves in following sequence as the rope is unwound from the reel.

The side plate 14 is provided with a series of holes or apertures 36 spaced apart on a line extending radially outwardly from the centre of rotation of the short shaft 27 in intervals corresponding to the radial throw of each of the stop faces 35.

A detent mechanism 37, as shown in FIGURE 3, which comprises an elongated flat metallic spring strip 38 is slidably secured to the outerside of side plate 14 by a retaining bracket at 39 and disposed so that its longitudinal axis is aligned with the holes 36, said strip having projecting from its undersurface at one end 40 thereof, an elongated pintle 41 and from its outer surface an operating handle 42. The pintle is elongated and of a diameter which will allow it to be freely inserted in any one of the holes, whereby the action of the strip 38 will thrust it transversely inwardly to lie across the path of a selected stop face 35 on the index plate 33 to thereby stop rotation of the latter. The spring being slidable relative to its longitudinal axis provides a means whereby the pintle 41 may be positioned over a selected hole of the series of holes 36.

Also carried over short shaft 27 is a clock spring 43, the inner end 44 thereof being secured to the shaft and the outer end 45 being secured to the frame as at 46, said spring being disposed to wind up as the reel is rotated by the unwinding of the rope to cause the reel to counter-rotate upon the rope being released to thereby rewind the rope on the reel.

In the use of the apparatus for water skiing, a battery of reels of the type above described are mounted on the stern of a boat, and, dependent upon the number of skiers to be pulled at one time, each individual reel apparatus is preset as to the length of rope to be pulled from each by means of the detent mechanism 37, that is, by inserting the pintle 41 in a suitable one of the holes 36 whereby each of the pintles so set will engage a different stop face of each of the stop faces 35 in each of the reel apparatus, thereby varying the amount of rotation of each of the index plates 33 to consequently vary the length of rope which may be unreeled from each of the reels.

It will be seen that there has been provided a reel apparatus which will permit a plurality of skiers to be started at predetermined consecutive intervals from a dock side or the like by a boat. This aspect is important when attempting to pull two or more skiers as many boats which are capable of bringing one skier to a planing position on his skis are not strong enough to bring two or more skiers to the same position simultaneously. Using the apparatus as described, each of the skiers may reach a planing position, which results in very little drag upon the boat, before the next skier's weight is taken, thus enabling the boat to maintain a speed sufficient to bring all skiers to the planing position.

Furthermore, the device of the present invention which will relieve skiers of the ever-present danger of a dangling ski rope should one skier lose his balance and be forced to release the rope. In the present invention, as soon as the skier releases his grip upon the rope, the clock spring immediately rewinds the rope on the reel and out of the way of the skiers.

What I claim as my invention is:

1. A reel apparatus comprising a frame having spaced side members, a shaft mounted for rotation between said side members, a rope-carrying reel fixedly secured to the shaft for rotation therewith, a first gear mounted on the shaft for rotation in unison therewith, a disc-like index member mounted for rotation in the frame and having a series of stops fixedly spaced apart in predetermined intervals around its periphery, said stops progressively radiating outwardly from the axis of the index member, in following sequence, a second gear connected to the index member for rotation in unison therewith intermeshing with and of larger diameter than the first mentioned gear to provide a gear ratio such that the index member will turn substantially one revolution when the rope is fully unwound, a detent adapted to be positioned in the path of a selected stop to engage the latter and halt the rotation of the reel after a predetermined length of rope has been unwound therefrom, said detent being positionally adjustable to permit same to be placed in the path of any one of said stops, and resilient means connected to the index member to resiliently resist movement of the latter as the reel is rotated by unwinding the rope therefrom, said resilient means automatically counterrotating the reel when the rope is released to rewind same on the reel.

2. A reel apparatus comprising a frame having spaced side members, a shaft mounted for rotation between said side members, a rope-carrying reel fixedly secured to the shaft for rotation therewith, a first gear mounted on the shaft for rotation in unison therewith, a second shaft parallel to the first journalled for rotation in the frame, a disc-like index member fixedly secured to said second shaft for rotation therewith, said member having a series of stops fixedly spaced apart in predetermined intervals around its periphery, said stops progressively radiating outwardly from the axis of the index member in following sequence, a second gear fixedly secured to the last-mentioned shaft for rotation therewith meshing with, and of larger diameter than, the first-mentioned gear to provide a gear ratio such that the index member will turn substantially one revolution when the rope is fully unwound, a detent adapted to be positioned in the path of a selected stop to engage the latter and halt the rotation of the reel after a predetermined length of rope has been unwound therefrom, said detent being positionally adjustable to permit same to be placed in the path of any one of said stops, and a helical spring around the second shaft having one end secured to the latter and the other end to the frame to resiliently resist rotation of said second shaft as the reel is rotated by unwinding the rope, said spring counterrotating the reel when the rope is released to rewind same.

3. A reel apparatus comprising a frame having spaced side members, a first shaft mounted for rotation between said side members, a rope-carrying reel fixedly secured to the shaft for rotation therewith, a first gear mounted on the shaft for rotation in unison therewith, a second shaft parallel to the first shaft journalled for rotation in the frame, a disc-like index member fixedly secured to said second shaft for rotation therewith, said disc-like index member being shaped at its peripheral edge so as to present a series of circumferentially spaced stops, each of said stops in the series being spaced radially outwardly of the stop preceding it, a second gear fixedly secured to the last-mentioned shaft for rotation therewith meshing with and of larger diameter than the first-mentioned gear to provide a gear ratio such that the index member will turn substantially one revolution when the rope is fully unwound, a detent adapted to be positioned in the path of a selected stop to engage the latter and halt the rotation of the reel after a predetermined length of rope has been unwound therefrom, said detent being positionally adjustable to permit same to be placed in the path of any one of said stops, and a helical spring around the second shaft having one end secured to the latter and the other end to the frame to resiliently resist rotation of said second shaft as the reel is rotated by unwinding the rope, said spring counterrotating the reel when the rope is released to rewind same.

4. A reel apparatus as claimed in claim 3 in which the detent comprises a pintle movably connected to the frame and arranged to be positioned so as to extend transversely across the peripheral edge of the disc-like member in the path of a selected stop, and means on the frame to releasably anchor the pintle when the latter has been suitably positioned to prevent movement thereof out of the path of said selected stop.

References Cited by the Examiner

UNITED STATES PATENTS

| | | | |
|---|---|---|---|
| 184,663 | 11/1876 | Reichert | 242—107.2 |
| 1,331,819 | 2/1920 | Matheny. | |
| 1,339,052 | 5/1920 | Bauer | 74—527 X |
| 2,309,574 | 1/1943 | Busha | 242—107 |
| 2,559,050 | 7/1951 | St. Clair | 242—107 X |
| 2,838,839 | 6/1958 | Gasdorf et al. | 33—136 |

MERVIN STEIN, *Primary Examiner.*